United States Patent
Swanson et al.

[11] Patent Number: 5,679,251
[45] Date of Patent: Oct. 21, 1997

[54] WOUND OIL FILTER

[75] Inventors: Kenneth E. Swanson, Rancho Santa Fe, Calif.; Charles W. Johnson, Amarillo, Tex.

[73] Assignee: The OilGuard Company, LLC, Vista, Calif.

[21] Appl. No.: 505,851

[22] Filed: Jul. 24, 1995

[51] Int. Cl.⁶ .................................................. B01D 27/06
[52] U.S. Cl. .................. 210/437; 210/457; 210/488; 210/489; 210/494.1; 210/497.01; 210/497.2; 210/502.1
[58] Field of Search .................. 210/437, 457, 210/488, 489, 494.1, 497.01, 497.2, 502.1

[56] References Cited

U.S. PATENT DOCUMENTS

| | | | |
|---|---|---|---|
| 2,141,903 | 12/1938 | Brundage | 210/494.1 |
| 3,065,856 | 11/1962 | Goldman | 210/494.1 |
| 3,088,594 | 5/1963 | Yelinek . | |
| 3,828,934 | 8/1974 | Green et al. | 210/494.1 |
| 4,016,080 | 4/1977 | Williams . | |
| 4,032,457 | 6/1977 | Matchett . | |
| 4,130,487 | 12/1978 | Hunter et al. . | |
| 4,187,136 | 2/1980 | Nostrand . | |
| 4,225,442 | 9/1980 | Tremblay et al. . | |
| 4,366,054 | 12/1982 | Kronsbein . | |
| 4,504,290 | 3/1985 | Pontius . | |
| 4,645,597 | 2/1987 | Wada . | |
| 4,655,939 | 4/1987 | Moser . | |
| 4,660,779 | 4/1987 | Nemesi et al. | 210/494.1 |
| 4,696,742 | 9/1987 | Shimazaki . | |
| 4,732,674 | 3/1988 | Tamura et al. . | |
| 4,751,901 | 6/1988 | Moor . | |
| 4,801,383 | 1/1989 | Hoffmann et al. . | |
| 4,915,837 | 4/1990 | Verity . | |
| 5,064,534 | 11/1991 | Busch et al. . | |
| 5,215,661 | 6/1993 | Tanabe | 210/494.1 |
| 5,334,451 | 8/1994 | Barboza | 210/494.1 |
| 5,419,373 | 5/1995 | May | 210/485 |

Primary Examiner—W. L. Walker
Attorney, Agent, or Firm—James Creighton Wray

[57] ABSTRACT

A diesel engine secondary oil filter is formed from a punched tinned steel spiral lock seam center tube, with a flanged cap at one end and a flanged threaded outlet at the other end. A layer of polyester non-woven media is wrapped in one wind around the center tube. A yarn is wound is a 27-diamond pattern in a first yarn section out to two inches outer diameter. The yarn is tied off. Knitted socks are first placed partially on axial ends of the first wound section, leaving half of the socks extending over the ends. A sheet of activated carbon paper about ⅙ of an inch thick and about 52 inches long is rolled onto the filter cartridge with about nine turns. The carbon paper is made of a cellulose paper impregnated with about 50% activated carbon powder by weight. After the activated carbon paper is wrapped around the first wound section, the free ends of the socks are pulled over axial ends of the activated carbon paper layers, and an outer yarn is wound around the activated carbon paper out to a four inch outer diameter. The yarn is a cotton fiber paper fiber blend, in which the paper fibers are created from crushed and torn two inch strips of thin loose fiber paper such as, for example, paper like toilet paper. The cotton and paper fibers are blended, carded and spun into yarn before the winding of the yarn. The inner wound section is made of that cotton paper fiber blend, or polypropylene yarn, or a yarn comprising two strands of cotton paper blend spun yarn and polypropylene yarn.

20 Claims, 1 Drawing Sheet

WOUND OIL FILTER

BACKGROUND OF THE INVENTION

Diesel engines when properly operating are known to be among the cleanest internal combustion engines available at this time.

Under certain conditions, diesel engines produce soot. While soot released in exhaust may be unsightly, it may not cause an environmental problem. Soot, which is fine carbon particles created in an engine from the fuel or from the combustion of the fuel, may cause problems in engine operation, and it is useful to remove the soot from the engine and from fluids associated with the engine operation. The soot may be left on the walls of diesel engines and may be transferred to engine oil upon a movement of the piston and lubricated piston rings along the cylinder wall. A certain amount of soot may be transferred to the oil by blowby of the hot pressure gases during engine operation.

The ordinary oil filters used in the diesel engines are not efficient in removing soot or fine carbon particles from the engine oil.

Clean engine oil results in extended oil life and improved engine operation throughout the oil life. To clean the oil in large diesel engines, the oil systems use a primary oil filter and a secondary oil filter. Only a small part of the oil passes through the secondary oil filter during operations. The secondary oil filter finishes and cleans fine particles from the oil that circulates through the secondary filter. While not all of the oil is cleaned by the secondary filter during each cycle of the oil, the cleaning of a small part of the oil through the secondary filter eventually results in continuous cleaning of substantially of the oil by the secondary filter during multiple cycles of the oil through the filtering system, which includes the primary filter.

A problem has existed and continues as to how to filter fine carbon particles and soot from the oil. This invention is directed to the solution of the problem.

SUMMARY OF THE INVENTION

A diesel engine secondary oil filter is formed from a punched tinned steel spiral lock seam center tube, with a flanged cap at one end and a flanged threaded outlet at the other end. A layer of polyester no-woven media is wrapped in one wind around the core. A yarn is wound in a first yarn section on the layer of polyester no-woven media in a 27-diamond wind pattern out to 2 inches outer diameter. The yarn is tied off, and a sheet of activated carbon paper about 52 inches long is rolled onto the filter cartridge with about nine turns. The carbon paper is made of a cellulose paper impregnated with about 50% activated carbon powder by weight. The activated carbon paper is about 1/16 of an inch thick. Before the activated carbon paper is added, knitted socks are placed partially on axial ends of the first wound section, leaving half of the socks extending over the ends. After the activated carbon paper is wrapped around the first wound section, the free ends of the socks are pulled over axial ends of the activated carbon paper layers, and an outer yarn is wound around the activated carbon paper out to a 4 inch outer diameter. The yarn is a cotton fiber paper fiber blend, in which the paper fibers are created from crushed and torn 2 inch strips of thin loose fiber paper such as, for example, paper like toilet paper. The cotton and paper fibers are blended, carded and spun into yarn before the winding of the yarn. The inner wound section is made of that cotton paper fiber blend, or polypropylene yarn, or a yarn comprising two strands of cotton paper blend spun yarn and polypropylene yarn. The polyester nonwoven media is lightweight, having a weight of about 0.8 ounces per square yard. The activated carbon paper is a cellulose paper about 1/16 of an inch thick impregnated with about 50% activated carbon powder by weight, with the carbon powder having a fine flour-like consistence and held in a binder.

An oil filter has a core with a central tube with a closed first end and an outlet connected to a second end of the central tube. Holes in the central tube flow oil inward into the tube. A first layer of yarn is wound in layers and around the tube. A wrapping of activated carbon paper is wound around the first section of yarn. A second section of yarn is wound around the activated carbon paper to an outside of the filter for flowing oil to the outside of the filter through the outer wound yarn section through the activated carbon paper, through the inner wound yarn section, and through the holes into the tube and out the outlet.

A layer of non-woven material is wound around the core between the core and the first section of wound yarn. The non-woven media is polyester material, which has a weight of about 0.8 ounces per square yard.

The inner wound yarn section is yarn blended and spun from cotton fibers and paper fibers. In another embodiment, the first section of wound yarn is polypropylene yarn. Alternatively, the first wound yarn section is a two-strand copolymer yarn. That first wound section has two strands of yarn wound together. A first strand is a cotton fiber and paper fiber blend spun together, and a second strand is a polypropylene yarn. The outer wound section is a blend of cotton and paper fibers spun together into a yarn.

Knitted socks extend around axial edges of the wound activated carbon paper and are positioned between end portions of the activated carbon paper and the wound yarn sections. The activated carbon paper is a cellulose paper impregnated with about 50% activated carbon powder by weight. The activated carbon paper is a black paper about 1/16 of an inch thick containing activated carbon powder of a flour-like consistency. In one example, the activated carbon paper is wound about nine turns around the inner wound yarn section. The inner wound section and the outer wound section are wound in a 27-diamond pattern.

A preferred wound yarn oil filter has a spiral lock seam tinned steel center tube with an outlet at one end and holes within the tube for conducting oil into the tube. A layer of polyester non-woven media has one wind around the core for permitting fibers from migrating through the holes during start of filter operations. A yarn has a 27-diamond wind wound around the core and non-woven media out to two inches outer diameter. A sheet of activated carbon paper having a cellulose paper impregnated with about 50% of activated carbon powder by weight wound around the inner wound yarn section. An outer wound yarn section is wound around the activated carbon paper out to a diameter of about four inches for flowing oil through the outer wound yarn section, through the activated carbon paper, through the inner wound section, through the polyester non-woven media and through the holes into the tube and out the outlet.

Knitted sleeves or socks extend around axial ends of the wound activated carbon paper, and between the carbon paper and the inner and outer wound yarn sections, for enclosing ends of the carbon paper in the knitted sleeves or socks.

A preferred method of winding oil filters for diesel engines includes covering a foraminous tinned steel center tube with a non-woven polyester media. Yarn is wound around the media out to an intermediate outer diameter. The yarn is tied off and a sheet of activated carbon paper is rolled around the inner wound section. Yarn is wound in an outer wound section around the activated carbon paper out to a predetermined outer diameter, and the yarn is tied off. A threaded outlet and radially extending flange assembly is secured to a first end of the center tube. A cap with a radially extending flange is secured to a second end of the center tube.

In preferred embodiments, first and second sleeves or socks are placed over axial end portions of the inner wound section before rolling the activated carbon paper onto the inner wound section. Free ends of the sleeves or socks are drawn around axial ends of the activated carbon paper after the activated carbon paper is rolled onto the inner wound section, and before the outer wound section is wound on the activated carbon paper.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
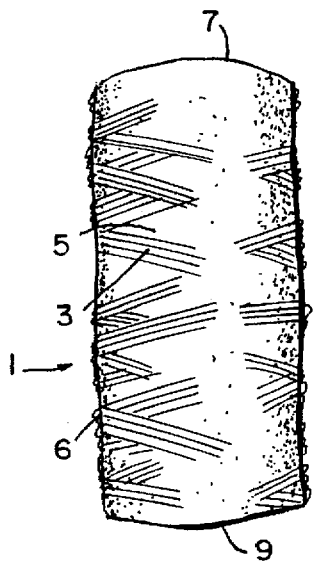
FIG. 1 is a perspective view of the filter.

FIG. 1 shows a cylindrical wound filter 1, having yarns 3 wound in diamond patterns 5. The filter has a cylindrical outer surface 6, an upper outlet end 7, and a lower capped end 9.

The yarns 3 are wound on the filter by turning the filter while passing a yarn guide axially back and forth in a timed relation with regard to the rotation of the filter around its axis.

Figure 2:
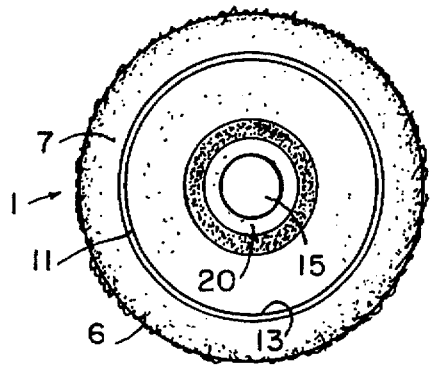
FIG. 2 is an outlet end view of the filter.
Figure 3:
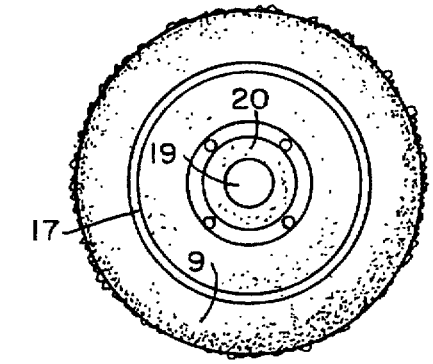
FIG. 3 is a cap end view of the filter.

After the filter is constructed, an outlet end 11 shown in FIG. 2 is attached to the upper end 7 by applying an epoxy to the inside of flange 13 and to the inside of internally threaded nipple 15, which extends partially into an outlet end of a central core. On the outlet 9 a flange 17 is connected with a cap 19, which seals the lower end. The flanges 13 and 17 have inner funnel-shaped recesses 20 which center the filter element in a housing by cooperating with complementary conical structures in the housing.

Figure 4:
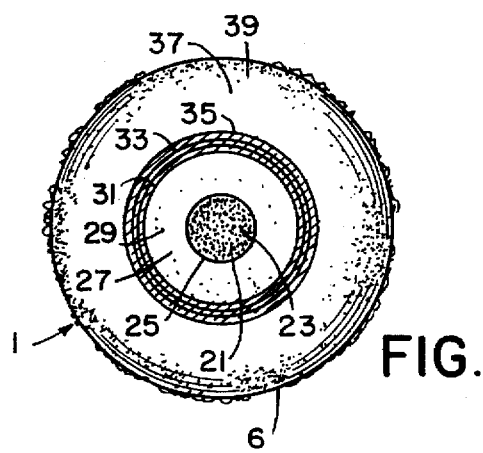
FIG. 4 is a schematic cross-sectional view of the filter.

As shown in the cross-section of FIG. 4, the filter i is wound about a central tinned steel core 21 with holes 23 which admit oil. The core has a single winding of polyester non-woven material 25. The core is then wound with yarn 27 in an inner wound section 29, with a regular 27 diamond pattern. The inner core section 29 is wound out to a two inch outer diameter, whereupon the yarn is tied off. Then layers of a cellulose filter paper 31 having activated carbon powder 33 impregnated paper are wound about nine turns 35. Yarn 37 is wound in outer segment 39 until the four inch outer diameter of surface 6 is reached. Finally, the flanges are sealed to the ends of the core.

Figure 5:
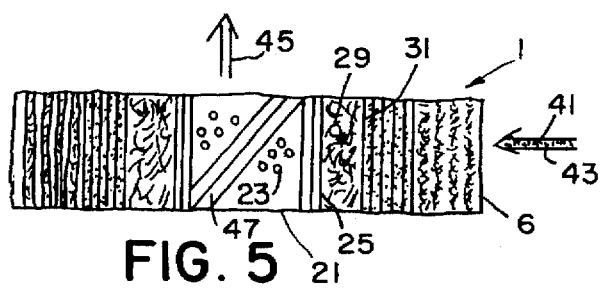
FIG. 5 is a schematic cross-section view of the filter showing the dirty oil flowing into the filter and the clean oil flowing out of the filter, and showing component layers of the filter.

FIG. 5 shows a cross-sectional detail of the filter. Oil 41 containing particles 43 flows in through the outer surface 6 of the filter 1, and then through the activated carbon paper layers 31, through the inner wound section 39, through the polyester non-woven layer 25, and through the openings 23 in the center tube 21. The clean oil 45 flows out of an outlet end of the center tube 21. As shown in the drawing, the center tube is formed by a tinned steel plate with a spiral lock seam 47.

Figure 6:
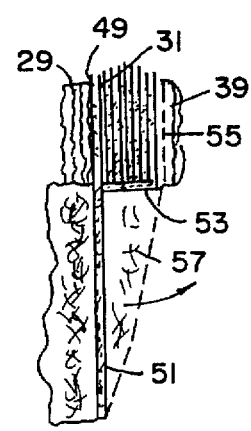
FIG. 6 is a detail of adding a sock to axial ends of the carbon paper.

As shown in FIG. 6 in a preferred method, knitted sleeves or socks, which may be 4 to 5 inches in length, are pulled over the axial end portions of the inner wound yarn section 29 before the layers of the activated carbon impregnated paper 31 are wound over the inner wound filter section 29. Only half of the sock or sleeve 49 is placed over the inner wound yarn section. The other half 51 extends over the wrapped ends of the active carbon impregnated cellulose filter layers 31. After the cellulose activated carbon paper wrapping is complete, the outer end of the sleeve 51 is pulled up over the ends 53 of the carbon paper layers, as shown by the dotted lines 55, before the outer yarn section 39 is wound.

In the finished filter, the sleeve section 57 at the axial ends 53 of the carbon paper layers provides a neat appearance of the filter. A finished 8 inch long filter with an outer diameter of 4 inches may weight about 17 ounces.

While the invention has been described with reference to specific embodiments, modifications and variations of the invention may be constructed without departing from the scope of the invention, which is defined in the following claims.

We claim:

1. An oil filter comprising a core having a central tube and an outlet connected to one end of the central tube, holes in the central tube for flowing oil inward into the tube, a first section of yarn wound in layers and around the tube, a wrapping of activated carbon paper wound around the first section of yarn, a second section of yarn wound around the activated carbon paper to an outside of the filter for flowing oil from the outside of the filter through the outer wound yarn section, through the activated carbon paper, through the inner wound yarn section, and through the holes into the tube and out the outlet.

2. The oil filter of claim 1, further comprising a layer of non-woven material wound around the core between the core and the first section of wound yarn.

3. The filter of claim 2, wherein the non-woven media comprises polyester material.

4. The filter of claim 3, wherein the polyester material has a weight of about 0.8 ounces per square yard.

5. The filter of claim 1, wherein the first wound yarn section comprises yarn blended and spun from cotton fibers and paper fibers.

6. The filter of claim 1, wherein the first section of wound yarn comprises polypropylene yarn.

7. The filter of claim 1, wherein the first wound yarn section comprises two-strand copoly yarn.

8. The filter of claim 1, wherein the first wound section comprises two strands of yarn wound together, a first strand comprising a cotton fiber and paper fiber blend spun together and a second strand comprising a polypropylene yarn.

9. The filter of claim 1, wherein the outer wound section comprises a blend of cotton and paper fibers spun together into a yarn.

10. The filter of claim 1, further comprising knitted socks extending around axial edges of the wound activated carbon paper and positioned between end portions of the activated carbon paper and the wound yarn sections.

11. The filter of claim 1, wherein the activated carbon paper comprises a cellulose paper impregnated with about 50% activated carbon powder by weight.

12. The filter of claim 11, wherein the activated carbon paper is a black paper about 1/16 of an inch thick containing activated carbon powder of a flour-like consistency.

13. The apparatus of claim 1, wherein the activated carbon paper is wound about nine turns around the first wound yarn section.

14. The filter of claim 1, wherein the first wound section and the outer wound section are wound in a 27-diamond pattern.

15. A wound yarn oil filter for diesel engine lubricating oil, having a spiral lock seam tinned steel center tube having an outlet at one end and having holes in the tube for conducting oil into the tube, a layer of polyester non-woven media having one wind around the core for preventing fibers from migrating through the holes during start of filter operations, a yarn having a 27-diamond wind wound in an inner section around the core and the non-woven media about two inches in outer diameter, a sheet of activated carbon paper having a cellulose paper impregnated with about 50% of activated carbon powder by weight wound around the inner wound yarn section, an outer wound yarn section wound around the activated carbon paper out to a diameter of about four inches for flowing oil through the outer wound yarn section, through the activated carbon paper, through the inner wound section, through the polyester non-woven media and through the holes into the tube and out the outlet.

16. The filter of claim 15, wherein the activated carbon paper is about 1/16 of an inch thick.

17. The filter of claim 16, further comprising knitted sleeves extending around axial ends of the wound activated carbon paper, and between the carbon paper and the inner and outer wound yarn sections, for enclosing ends of the carbon paper in the knitted sleeves.

18. The method of winding lube oil filters for diesel engines, comprising covering a foraminous tinned steel center tube with a non-woven polyester media, winding yarn around the media out to an intermediate outer diameter, tying off the yarn and rolling a sheet of activated carbon paper around the inner wound section, and winding yarn in an outer wound section around the activated carbon paper out to a predetermined outer diameter and tying off the yarn.

19. The method of claim 18, further comprising placing first and second sleeves placing over axial end portions of the inner wound section before rolling the activated carbon paper onto the inner wound section, and drawing free ends of the sleeves around axial ends of the activated carbon paper after the activated carbon paper is rolled onto the inner wound section, and before the outer wound section is wound on the activated carbon paper.

20. The method of claim 18, further comprising securing a threaded outlet and radially extending flange assembly to a first end of the center tube and securing a cap having a radially extending flange to a second end of the center tube.

* * * * *